(12) United States Patent
Grigsby et al.

(10) Patent No.: US 10,067,918 B2
(45) Date of Patent: *Sep. 4, 2018

(54) ENCODING TEXT UNITS

(71) Applicant: Amazon Technologies, Inc., Seattle, WA (US)

(72) Inventors: Travis M. Grigsby, Seattle, WA (US); Chen H. Leo, Mill Creek, WA (US); Bucky A. Jordan, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 86 days.

This patent is subject to a terminal disclaimer.

(21) Appl. No.: 15/207,578

(22) Filed: Jul. 12, 2016

(65) Prior Publication Data

US 2016/0321219 A1 Nov. 3, 2016

Related U.S. Application Data

(63) Continuation of application No. 13/622,080, filed on Sep. 18, 2012, now Pat. No. 9,424,249.

(51) Int. Cl.
*G06F 3/00* (2006.01)
*G06F 17/22* (2006.01)
*G06F 17/27* (2006.01)
*G06F 17/21* (2006.01)
*G06F 3/0484* (2013.01)
*H04L 9/14* (2006.01)
(Continued)

(52) U.S. Cl.
CPC ...... *G06F 17/2229* (2013.01); *G06F 3/04842* (2013.01); *G06F 17/211* (2013.01); *G06F 17/218* (2013.01); *G06F 17/2217* (2013.01); *G06F 17/2765* (2013.01); *G06F 17/2785* (2013.01); *H04L 9/14* (2013.01); *H04L 9/30* (2013.01); *H04L 9/3247* (2013.01)

(58) Field of Classification Search
CPC .. G06F 3/04842; G06F 17/211; G06F 17/218; G06F 17/2217; G06F 17/2765; G06F 17/2785; H04L 9/14; H04L 9/30; H04L 9/3247

See application file for complete search history.

(56) References Cited

U.S. PATENT DOCUMENTS 5,680,478 A 10/1997 Wang et al.
6,289,121 B1 9/2001 Abe et al.
(Continued)

*Primary Examiner* — Kyle Stork
(74) *Attorney, Agent, or Firm* — Thomas | Horstemeyer, LLP

(57) ABSTRACT

Disclosed are various embodiments of systems that may identify a series of characters within a text block, wherein the series of characters are a subset of the text block. A system may bind the series of characters to generate a text unit and an encoded text block. The encoded text block may include a first signal indicating that an entirety of the series of characters in the text unit is to be selected in response to a subset of the series of characters being selected. The system may select, in response to the first signal and at least a portion of the subset of the series of characters being selected, the entirety of the series of characters in the text unit. The system may generate a modified encoded text block in response to an instruction to treat the series of characters as being unbound. The modified encoded text block may include a second signal indicating that a portion of the series of characters is to be selected in response to the portion of the series of characters being selected.

20 Claims, 8 Drawing Sheets

(51) Int. Cl.
 *H04L 9/30* (2006.01)
 *H04L 9/32* (2006.01)

(56) References Cited

U.S. PATENT DOCUMENTS

| 7,751,805 B2 | 7/2010 | Neven et al. |
| 2005/0075859 A1 | 4/2005 | Ramsey |
| 2007/0011134 A1 | 1/2007 | Langseth et al. |
| 2007/0136433 A1 | 6/2007 | Booton et al. |
| 2012/0100832 A1 | 4/2012 | Mao et al. |
| 2013/0159827 A1 | 6/2013 | Wong et al. |
| 2013/0300562 A1 | 11/2013 | Krasinskiy et al. |

ENCODING TEXT UNITS

CROSS-REFERENCE TO RELATED APPLICATIONS

This application is a continuation of and claims priority to U.S. patent application Ser. No. 13/622,080, entitled "ENCODING TEXT UNITS," filed Sep. 18, 2012, which is hereby incorporated by reference in its entirety.

BACKGROUND

Text processing applications allow users to author text and read text generated by other entities. When reading text generated by other entities, a user may perform various operations on text rendered by the text processing application. For example, a user may make a text selection of a portion of the text that is presented to a user. A user may use various computer inputs such as a mouse or keyboard to highlight portions of the text for text selection. Selected text may then be used by the user for various applications such as copying the selected text or transferring the selected text as an input to another computer application.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Figure 1:
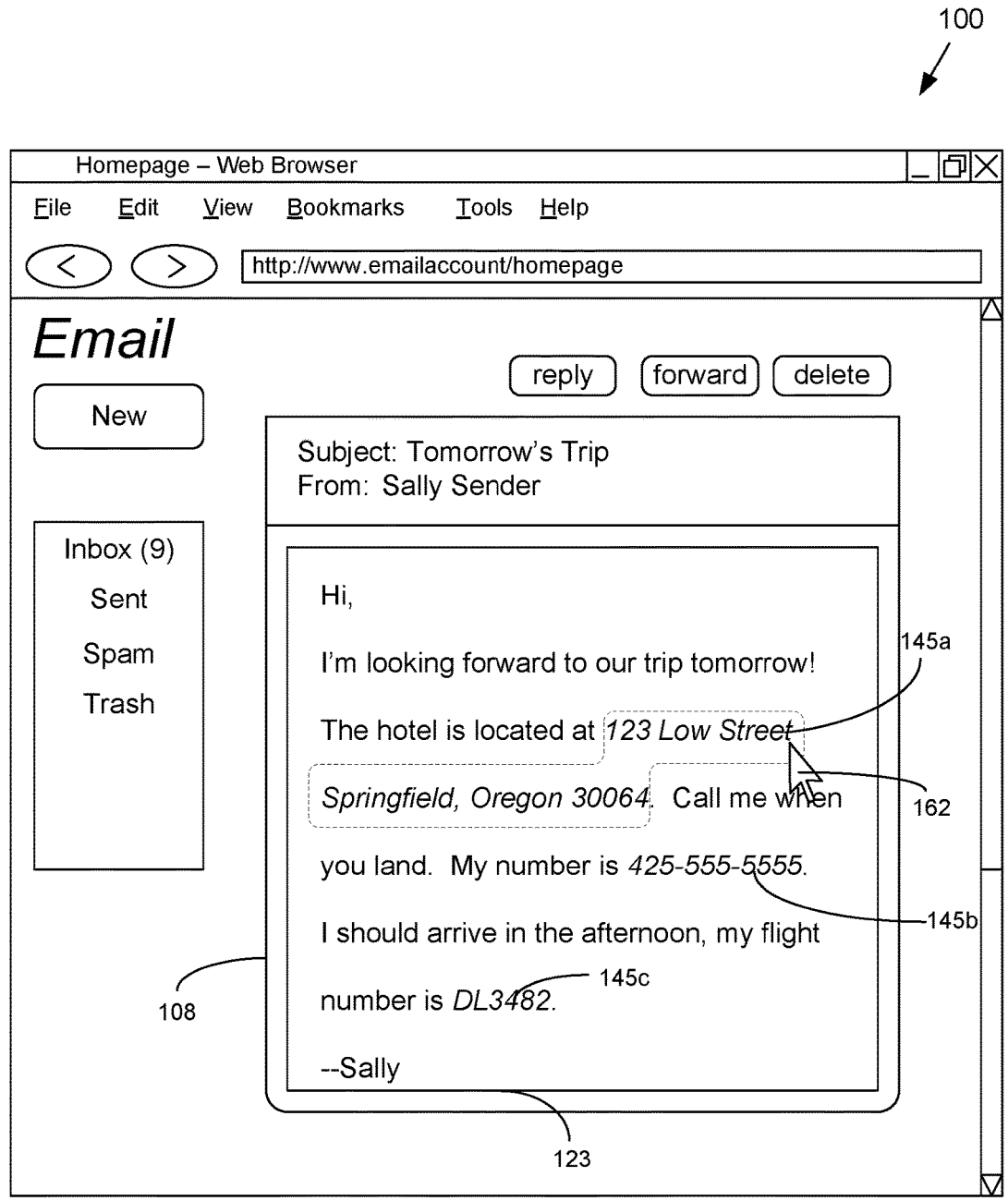
FIG. 1 is a drawing of an example of a user interface according to various embodiments of the present disclosure.

The present disclosure is directed towards allowing a user to author text using text units. When a text author finishes authoring a piece of text, the piece of text may be encoded with the text units. A text unit is a series of characters in the authored text that is bound together. In this respect, a text unit may be referred to as a text atom. By binding text together, the text may be selected by a user. This facilitates efficient and easy text selection by users. Furthermore, text authors have control over specifying which parts of his or her text is treated as a text unit. A non-limiting example follows with reference to FIG. 1.

A user may access an application such as, for example, a web browser that facilitates a reading of authored text. The application provides a network page 100 that employs a text reader 108 such as, for example, a reader panel in an email application. The text reader 108 provides a function that facilitates a reading of a text input such as a text block 123. In the non-limiting example of FIG. 1, Sally, a text author, sends a user a text block 123 in the form of an e-mail message.

Sally may have specified in her e-mail message a number of text units 145*a-c*. Sally may have specified these text units manually or automatically. For example, a first text unit 145*a* is the address of "123 Low Street Springfield, Oreg. 30064." A second text unit 145*b* is a phone number of "425-555-5555." And a third text unit is an identifier for a flight number of "DL3482." The user may select the text contained in the text block 123 using a computer input device such as, for example, a mouse, a keyboard, a touch screen, or any combination thereof. The user may use a cursor 162 to select portions of the text block 123. In this respect, the user highlights a portion of the text in the text block 123. This may require a user to highlight each one of the characters in the text block 123 for highlighting.

However, if the user wishes to textually select a portion of the text block 123 that corresponds to a text unit 145, then the user may select any portion of the text included in a text unit 145. When reading Sally's e-mail, the user may hover over a text unit 145*a* and click any portion of the text unit 145*a* to select all of the characters in the text unit 145*a*. The text reader 108 may visually offset a text unit 145 from the remainder of the text in the text block 123. For example, the text reader 108 may apply a font or text format that visually distinguishes the text unit 145 such as, for example, italics, bold, etc. Furthermore, the text reader 108 may visually offset a text unit 145*a* when a user hovers over a text unit 145*a* using a cursor 162. This allows a user to visually identify text units 145 in a text block 123.

Thus, a user may simply select an entire address, phone number, a flight number, or any other text unit 145 specified by a sender using text units in a network page 100 that employs the text reader 108. In the following discussion, a general description of the system and its components is provided, followed by a discussion of the operation of the same.

Figure 2:
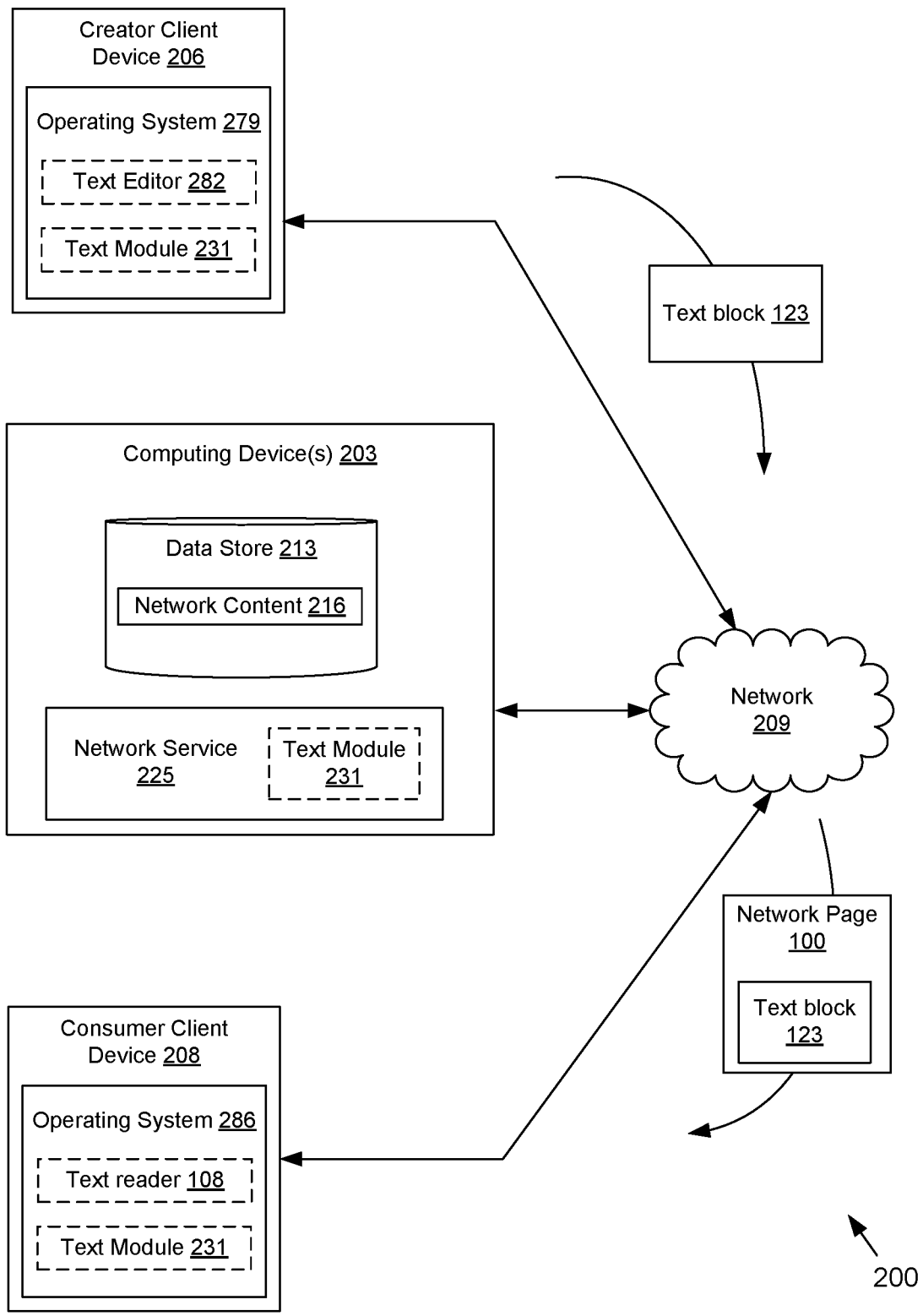
FIG. 2 is a drawing of a networked environment according to various embodiments of the present disclosure.

With reference to FIG. 2, shown is a networked environment 200 according to various embodiments. The networked environment 200 may include one or more computing devices 203, one or more client devices 206, 208, and possibly other devices in data communication through a network 209. The network 209 may include, for example, the Internet, intranets, extranets, wide area networks (WANs), local area networks (LANs), wired networks, wireless networks, peer to peer networks, any other suitable networks, or any combination thereof.

The computing device 203 may comprise, for example, a server computer or any other system providing computing capability. Alternatively, a plurality of computing devices 203 may be employed that are arranged, for example, in one or more server banks, computer banks, or other arrangements. For example, a plurality of computing devices 203 together may comprise a cloud computing resource, a grid computing resource, and/or any other distributed computing arrangement. Such computing devices 203 may be located in a single installation or may be distributed among many different geographical locations. For purposes of convenience, the computing device 203 is referred to herein in the singular. Even though the computing device is referred to in the singular, it is understood that a plurality of computing devices 203 may be employed in the various arrangements as described above.

Various applications and/or other functionality may be executed in the computing device 203 according to various embodiments. Also, various data may be stored in a data store 213 that is accessible to the computing device 203. The data store 213 may be representative of a plurality of data stores as can be appreciated. The data stored in the data store 213, for example, may be associated with the operation of the various applications and/or functional entities to be described later.

For instance, the data store 213 may include network content 216. Network content 216 may be, for example, content generated by any user or text author in communication with the computing device 203 over network 209. For example, network content 216 may be e-mail messages, documents, files, reports, or any other data expressing text generated by a text author or some other text generating entity or application.

The components executed on the computing device 203 include, for example, a network service 225. The network service 225 may be an e-mail application, web portal, or any other network site that provides text to a user. The network service may receive data over network 209 and store the data as network content 216. The network service 225 may encode for display network pages 100 or network content 216 embodied in some other form that facilitates access to the network content 216. The network service may include a network page server to serve data such as the network pages 100 to clients, such as the client devices 206, 208 over a protocol such as hypertext transfer protocol (HTTP), simple object access protocol (SOAP), and/or other protocols. Such a network page server may comprise a commercially available network page server such as, for example, Apache® HTTP Server, Microsoft® Internet Information Services (IIS), and/or other network page servers.

The network service 225 comprises a text module 231. The text module 231 may be implemented as a portion of a text reader or text editor application. Thus, the text module 231 facilitates authoring text and/or presenting text to a user. The text module 231 is responsible for implementing the protocols that provide the use of text units 145 during the editing stage of a text block 123 or the reading stage of the text block 123. To this end, the text module 231 creates and interprets data structures that manage text units 145. When facilitating the authoring of a text block 123, the text module 231 allows a text author to define one or more text units 145 (FIG. 1) in the authored text, according to various embodiments of the present disclosure. When facilitating a reading of a text block 123, the text module 231 allows a user to read text that comprises one or more text units 145. Thus, the text module 231 supplements text reading and/or text editing functionality.

The creator client device 206 is representative of a plurality of creator client devices 206 that may be used by one or more text authors who are authoring pieces of text, such as text blocks 123, to be read by other users. The creator client device 206 may comprise, for example, a processor-based system such as a computer system. Such a computer system may be embodied in the form of a desktop computer, a laptop computer, a personal digital assistant, a cellular telephone, a set-top box, a music player, a web pad, a tablet computer system, a game console, or other device with like capability.

The creator client device 206 may be configured to execute various applications on an operating system (OS) 279. The OS 279 may function as a platform that supports applications, such as a text editor 282 and other applications. The text editor 282 may provide a user interface to facilitate interaction with and control of the text editor 282 and the creator client device 206. The text editor 282 may also employ any number of text editing functions to facilitate the generation of one or more text blocks 123. A text block 123 may be, for example, a piece of text that expresses the content of an e-mail, a report, a communication, a text document, or any other series of characters authored by a text author or generated by an application. The creator client device 206 may be communicatively coupled to the computing device 203 by way of network 209. To this end, the creator client device 206 may use the network service 225 to send one or more text blocks 123 to the computing device 203. The text blocks 123 may be stored in the computing device 203 as network content 216.

A text module 231 may be executed locally on the creator client device 206 to facilitate the text editing functionality of the text editor 282. The text module 231 may be executed as a module of the operating system 279 or it may be executed as a portion of the text editor 282. A creator client device 206 may also employ a text module 231 that is executed remotely on a computing device 203 by way of a network 209.

The creator client device 206 may access and render network pages 100, such as web pages, or other network content served up by the computing device 203 and/or other servers. To this end, the text editor 282, in various embodiments, may be embodied as a web browser. The creator client device 206 may also be configured to execute applications beyond the text editor 282, such as email applications, instant message applications, and/or other applications.

The consumer client device 208 is representative of a plurality of consumer client devices 208 that may be used by one or more users who are reading pieces of text such as text blocks 123 that were authored by other entities using, for example, a creator client device 206. The consumer client device 208 may comprise, for example, a processor-based system such as a computer system. Such a computer system may be embodied in the form of a desktop computer, a laptop computer, a personal digital assistant, a cellular telephone, a set-top box, a music player, a web pad, a tablet computer system, a game console, or other device with like capability.

The consumer client device 208 may be configured to execute various applications on an operating system (OS) 286. The OS 286 may function as a platform that supports applications, such as a text reader 108 and other applications. The text reader 108 may employ any number of text reading functions to facilitate the presentation of text blocks 123 comprising one or more text units 145. The text reader 108 may also provide a user interface to facilitate interaction with and control of the text reader 108 and the consumer client device 208. The consumer client device 208 may be communicatively coupled to the computing device 203 by way of network 209. To this end, the consumer client device 208 may use the network service 225 to obtain one or more text blocks 123 from the computing device 203. The text blocks 123 may be stored in the computing device 203 as network content 216.

The consumer client device 208 may access and render network pages 100, such as web pages, or other network content served up by the computing device 203 and/or other servers. To this end, the text reader 108, in various embodiments, may be embodied as a web browser. The consumer client device 208 may receive network pages 100 from computing device 203. The network pages 100 may include a text block 123 authored by another entity. The consumer client device 208 may also be configured to execute applications beyond the text reader 108, such as email applications, instant message applications, and/or other applications.

A text module 231 may be executed on the consumer client device 208 to facilitate the text reading functionality of the text reader 108. The text module 231 may be executed as a module of the operating system 286 or it may be executed as a portion of the text reader 108. A consumer client device 208 may also employ a text module 231 that is executed remotely on a computing device 203 by way of a network 209.

Next, a general description of the operation of the various components of the networked environment 200 is provided. To begin, a text author using a creator client device 206 may author text using the text editor 282. For example, the text author may generate a text document. The content generated by the text author is referred to as a text block 123. To this end, a text block may range from a few characters to many paragraphs of text. The text block 123 may be interpreted as a series of characters generated by a text author for the purpose of written communication.

The user authored text block 123 may comprise one or more text units 145. These text units 145 may be specified by a text module 231, as is discussed further in detail below. When a text author completes the authoring of the text block 123 the text author may store, save, upload, or otherwise publish the text block to the computing device 203. By publishing the text block 123, the text module 231 may encode the text block 123 to include the text units 145. The encoded text block includes data structures indicating that text units 145 are embedded in the text block 123. The encoded text block 123 may be uploaded to computing device 203 using a network service 225. Thus, encoded text block 123 is stored as network content 216 in a data store 213 in the computing device 203.

A consumer client device 208 may access the computing device 203 and/or the creator client device 206 by way of network 209. The consumer client device 208 may use the network service 225 to obtain data from the computing device 203. Specifically the computing device 203 may send one or more network pages 100 to the consumer client device 208. These network pages 100 may include an encoded text block 123 that was authored by an entity using a creator client device 206. Alternatively, the creator client device 206 may directly send encoded text blocks 123 to the consumer client device 208 over a network 209 such as, for example, a peer to peer network.

A user using a consumer client device 208 may execute a text reader 108 to facilitate a reading of the encoded text block 123. The text reader 108 may locally or remotely employ a text module 231 to allow a decoding and rendering of the encoded text block 123 as well as one or more text units 145 associated with the text block 123. Through the use of the text reader 108 and the text module 231, the consumer client device 208 may utilize, select, and/or manipulate the text units 145 associated with the text block 123, as is discussed in further detail below.

Figure 3:
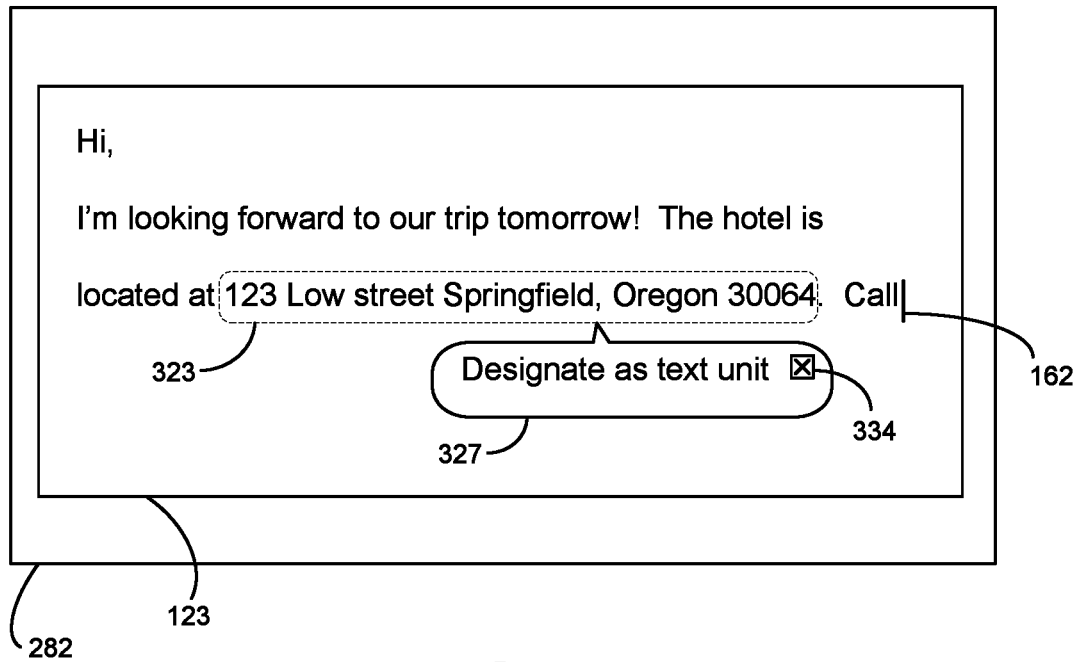
FIG. 3 is a drawing of an example of a text editor rendered by a computing device and/or client device in the networked environment of FIG. 2 according to various embodiments of the present disclosure.

Referring next to FIG. 3, shown is an example of a text editor 282 rendered by a computing device 203 (FIG. 2) and/or client device 206, 208 (FIG. 2) in the networked environment 200 of FIG. 2 according to various embodiments of the present disclosure. The non-limiting example of FIG. 3 depicts a text editor 282 implemented along with a text module 231 (FIG. 2) that facilitates the text editing of a text block 123. In this respect, the text module 231 allows the text editor 282 to implement text units 145 (FIG. 1) according to various embodiments of the present disclosure. The text module 231 may be executed in a computing device 203 or a creator client device 206. Thus, an entity using a creator client device 206 may edit a text block 123 while employing local or remote text editing functions implemented in a creator client device 206 and/or a computing device 203.

The text editor 282 allows a text author to edit/generate text using a cursor 162 (FIG. 1). The placement of the cursor 162 initiates a location in the text block 123. The text author may enter a series of characters at the location of the cursor 162. For example, the series of characters in the non-limiting example of FIG. 3 expresses an e-mail message.

The non-limiting example of FIG. 3 depicts an example of how the text module 231 is configured to automatically analyze text units while the user is authoring the text block 123. For example, FIG. 3 depicts a detected text unit 323 that recites "123 Low Street Springfield, Oreg. 30064." The text editor 282 provides a user interface that allows a text author to author text. The user interface may comprise a text unit menu 327. The text unit menu 327 may indicate to the text author the presence of a detected text unit 323. The text unit menu 327 may include a cancel option 334.

In various embodiments of the present disclosure, the text module 231 may automatically detect the presence of a text unit such as, for example, the detected text unit 323. In this respect, the text module 231 facilitates a dynamic detection of the presence of a text unit 145. For example, as a user types a series of characters, the text module 231 may identify that a portion of the series of characters in a text block 123 is a text unit. In response to the text module 231 identifying a detected text unit 323, a text unit menu 327 is presented to the text author. The text unit menu 327 indicates to the text author that a detected text unit 323 has been identified by the text module 231. The text unit menu 327 allows a text author to confirm that the detected text unit 323 is to be treated as a text unit. The cancel option 334 allows a text author to remove the automatic text unit designation of the detected text unit 323.

In other embodiments of the present disclosure, the text module 231 performs an analysis of the text block 123 for identifying any detected text units 323 in response to an input from the text author. For example, the text author may initiate the automatic detection of any text unit in the text block 123 at a time specified by the text author. Thus, rather than dynamically identifying detected text units 323, the text module 231 performs an analysis of the text block 123 to detect any text unit upon instruction from the text author.

Whether the detected text unit 223 is identified by the text module 231 dynamically or in response to a text author input, the text module 231 is configured to parse the series of characters included in the text block 123 to detect a text unit. To effectuate the automatic detection of a text unit, the text module 231 may be configured to analyze a series of characters included in the text block 123 according to any number of pre-designated signals and/or symbols such as, for example, one or more sentinel characters. For example, a particular character may indicate to the text module 231 that a following series of characters is to be designated as a text unit. In this respect, tags may be used by the text author to signal to the text module 230 that a series of characters is to be treated as a text unit. As a non-limiting example, sentinel characters or tags may be expressed in the form of special characters such as, for example, "$$," "&&," "@%," "< >," "</text unit>," etc.

In other embodiments, the text module 231 may automatically detect a text unit based on contextual words, terms, or characters included in the text block 123. For example, a text module 231 may interpret the term "username" as a signifier that a following series of characters is to be treated as a text unit.

As another non-limiting example, the text module 231 treats any term that includes a combination of letters and numbers as a text unit. For example, if the text block 123 includes a series of characters of "my flight number is DL3482," then the term "DL3482" may be a detected as a text unit because that term comprises both letters and numbers. Other non-limiting examples of a rule is treating a series of characters as a text unit when the series of characters comprises a combination of letters and symbols or a combination of numbers and symbols, For example, letters may be any letter of the alphabet, numbers may be any numeral, and symbols may be any non-letter and non-number character. As an example, the string "16432-342" combines numbers with the hyphen symbol. Such a combination of characters may trigger text unit treatment. Thus, when a word or phrase includes symbols and/or numbers, the word or phrase may be designated as a text unit 145.

This may allow a text module 231 to automatically identify tracking numbers, flight numbers, item numbers, or any other identifier as a detected text unit.

In yet other embodiments of the present disclosure, the text module 231 is configured to identify a text unit in a text block 123 based on one or more rules. Rules may be predetermined or rules may be specified by a text author. For example, a non-limiting example of a rule is to treat each sentence as a text unit. In this respect, when a text module 231 identifies a series of characters in between a first period and a second period, the text module 231 may designate that series of characters as a detected text unit. As another non-limiting example, the text module 231 may implement a rule that specifies each paragraph as a text unit. According to the various embodiments of the present disclosure these rules may be applied dynamically or in response to an input received from the text author. Upon an application of these rules, text units may be detected and a text unit menu 327 may prompt the text author to confirm that a detected text unit 323 is to be treated as a text unit.

Figure 4:
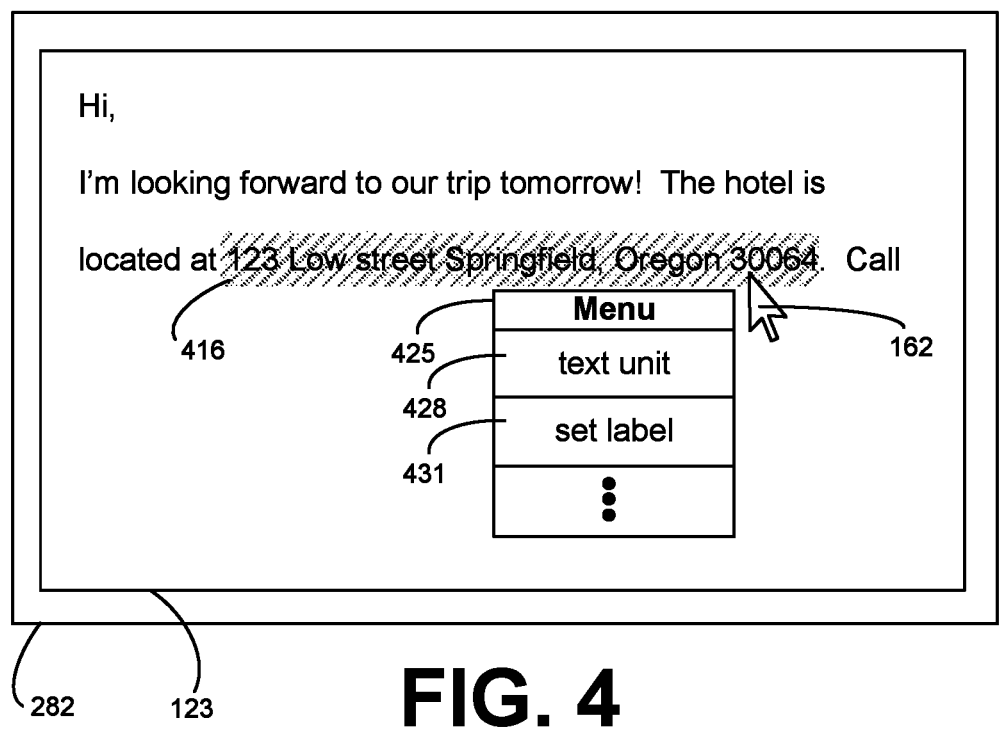
FIG. 4 is a drawing of an example of a text editor rendered by a computing device and/or client device in the networked environment of FIG. 2 according to various embodiments of the present disclosure.

Turning now to FIG. 4, shown is an example of a text editor 282 rendered by a computing device 203 (FIG. 2) and/or client device 206, 208 (FIG. 2) in the networked environment 200 of FIG. 2 according to various embodiments of the present disclosure. FIG. 4 provides a non-limiting example of a text editor 282 that is executed along with a text module 231 (FIG. 2) for facilitating an authoring of a text block 123 by the text author. The text editor 282 comprises a user interface that allows a text author to author a text block 123. The user interface allows a manual specification of a series of characters of the text block 123 as a text unit.

The user interface comprises a cursor 162 to input a highlighted region 416 in the text block 123. The highlighted region 416 specifies a series of characters in the text block 123. In this respect, the text author manually designates the series of characters as a text unit 145 (FIG. 1). The user interface may comprise a menu 425 that allows a text author to create a text unit 145 in the text block 123. The menu 425 includes options such as, for example, a text unit designator 428 and a label designator 431.

In various embodiments of the present disclosure, the menu 425 is presented to the text author when the text author specifies a highlighted region 416 and indicates to the text editor 282 and/or text module 231 to trigger a presentation of the menu 425 in the user interface. For example, a text author may highlight a series of characters and submit a right click mouse input to the text editor 282 and/or text module 231. The text author may select the text unit designator 428 to instruct the text module 231 to treat the series of characters included in the highlighted region 416 as a text unit 145. In this respect, text units 145 are identified manually based on a designation by the text author.

In addition, the text author may specify a label for the text unit 145 by selecting a label designator 431. Various embodiments of the present disclosure provide assigning labels to each text unit 145 in a text block 123. A label may categorize a text unit 145 to facilitate a subsequent processing of the text block 123 or a treatment of text units 145 as an input to other applications. A label, for example, may classify a particular text unit 145 as a mailing address, shipping address, residential address, phone number, proper name, geographic address, personal address, a geographic location, a commercial item identifier, a tracking number, or any other category that classifies a particular text unit 145.

In various embodiments, a label may be manually assigned to a text unit 145. In this case, a text author may select one or more labels among a group of labels for a particular text unit 145. In the non-limiting example of FIG. 4, a text author may manually set the label for the text unit 145 of "123 Low Street St., Springfield, Oreg. 30064." Specifically the text author may use a label designator 431 to set the label of this text unit 145 as a personal address.

In other embodiments of the present disclosure, labels may be automatically designated for text units 145. The text module 231 may determine a label for a particular text unit 145 based at least upon the content of the text unit 145 and/or the context of the text unit 145. For example, the text module 231 may be configured to analyze the text unit 145 of FIG. 4 to determine an appropriate label. The text module 231 may analyze portions of the text unit 145 such as, the presence of numerals, the term "street," the presence of proper nouns of geographic locations, or any other indicator of an address. Based on these portions of the text unit 145, the text module 231 may designate this text unit 145 as an address. Moreover, the text module 231 may analyze the context of the text unit 145 with respect to other portions of text in the text block 123. For example, the text module 231 may use the terms "hotel" and/or "located" to build a quantifiable confidence that the text unit 145 should be labeled as an address. The proximity of contextual terms to the text unit 145 may be used in determining a label for the text unit 145. The terms "hotel" and "located," which may be associated with addresses, are proximately close to the text unit 145. Therefore, the text module 231 may label the text unit 145 as an address.

When a text author completes authoring a particular text block 123, the text author may instruct the text editor 282 to publish the text block 123. That is to say, the text block 123 is to be encoded by the text editor 282 and/or text module 231 for rendering for user to read the text block 123 in a text reader application. When a text block 123 is encoded, the encoded text block comprises data structures that indicate that the text block 123 is embedded with one or more text units 145. These data structures provide signals that instruct the text reader application to handle one or more text units 145 embedded in the text block 123. Thus, when a text module 231 decodes and renders the encoded text block 123, the text reader application may identify text units 145 designated by the text author. The encoded text block 123 may also include data structures that associate each text unit 145 with a corresponding label. These data structures function as signals that are interpreted by the text module 231. These signals, for example, may be tags included in the encoded text block 123 that designate a particular series of characters as the text unit 145. By publishing the text block 123, the text block 123 is encoded with data structures and saved on the creator client device 206 or the encoded text block 123 is sent to a computing device 203 (FIG. 2) over network 209 (FIG. 2).

Figure 5:
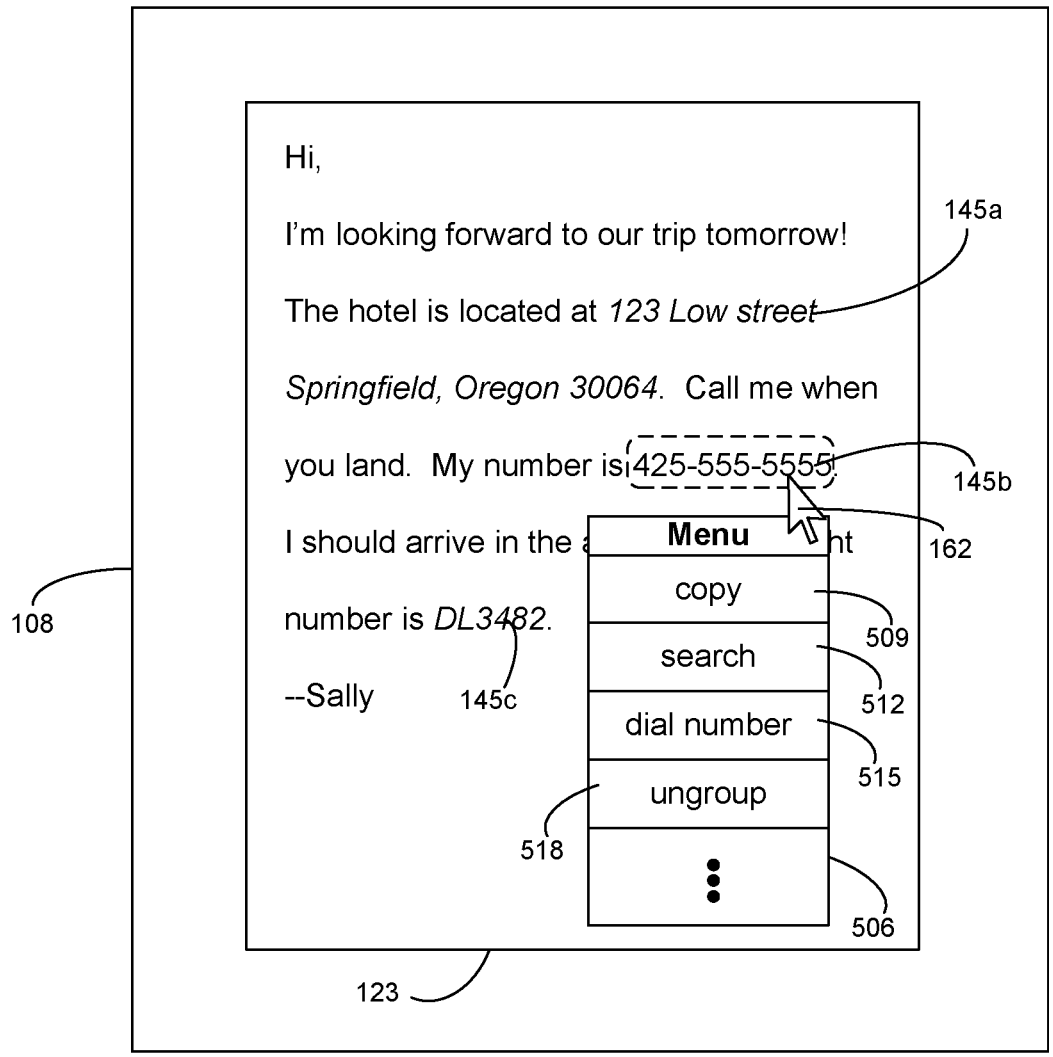
FIG. 5 is a drawing of an example of a text reader rendered by a computing device and/or client device in the networked environment of FIG. 2 according to various embodiments of the present disclosure.

Referring next to FIG. 5, shown is an example of a text reader 108 rendered by a computing device 203 (FIG. 2) and/or client device 206, 208 (FIG. 2) in the networked environment of FIG. 2 according to various embodiments of the present disclosure. FIG. 5 provides a non-limiting example of a text reader 108 configured to decode and render an encoded text block 123 for a user. The text reader 108 may be executed in a consumer client device 208 (FIG. 2). The text reader 108 may further be executed along with a text module 231 (FIG. 2). The text module 231 may be executed locally on consumer client device 208 or remotely on a computing device 203 (FIG. 2).

The text reader 108 and the text module 231 are configured to receive an encoded text block 123. Furthermore, the text reader 108 and text module 231 are configured to decode the encoded text block 123 and render it for display to a user as a decoded text block 123. The decoded text block 123 may comprise various text units 145. Each text unit 145 may be associated with a corresponding label. The text reader 108 may comprise a user interface that facilitates an interaction with the decoded text block 123 and the text units 145 included in the decoded text block 123. The user interface may include a cursor 162 that allows a user to select portions of the decoded text block 123 as well as textually selecting the text units 145.

The user interface may also provide a menu 506 to the user in response to an interaction with one or more text units 145 in the decoded text block 123. The menu 506 may include a copy option 509, a search option 512, an external application function call 515, an ungroup option 518, or any other options for interacting with the text unit 145.

As a user interacts with the decoded text block 123, the user may use a cursor 162 to select portions of text included in the decoded text block 123. This may be done by highlighting portions of text using the cursor 162. In this respect, the user may be required to designate each character included in the portion of text that is subject to highlighting. By manually performing a text selection of a range of characters, there is an associated risk of inadvertently omitting leading characters or ending characters in the series of highlighted characters. In various embodiments of the present disclosure, this risk may be reduced by using text units 145 to facilitate a text selection of a series of characters.

If a user wishes to perform a text selection of a text unit 145 the user may select any portion of the text unit 145 to select the entire text unit 145. In this respect, the user need not specify the entire range of characters associated with a particular text. Rather, a user may select or otherwise perform a mouseclick operation on a portion of the text corresponding to a particular text unit 145 to select the entire text unit 145. In various embodiments, the text reader 108 visually distinguishes a selected text unit 145 from other portions of text included in the decoded text block 123.

The text reader 108 initially prevents textually selecting a subset of the series of characters of a text unit 145. For example, if a user wishes to select the text of "425-555-5555," the text reader 108 initially prevents the user from selecting a portion of this number. That is to say, the user is required by the text reader 108 to select the entire text unit 145b if the user performs a text selection on any portion of the text unit 145b. To this end, the text reader 108 treats each of the characters in the text unit 145b as a series of characters that are bound together.

In various embodiments, the text reader 108 permits a text selection of a portion of a text unit 145a-c once the text reader 108 receives a user selection of the text unit 145. For example, the text reader 108 initially prevents a user from selecting the area code "425" of the text unit 145b until the user selects the entire text unit 145b.

The user interface of the text reader 108 may include a menu 506 that is presented to a user upon the selection of a text unit 145. The copy option 509 of the menu 506 allows a user to copy the series of characters of the text unit 145 to a clipboard of the text reader 108 and/or the operating system upon which the text reader 108 is executed. This allows a user to quickly copy portions of the decoded text block 123 that a text author specified as a text unit 145. The search option 512 allows a user to submit the series of characters of the text unit 145 to a search application executed on the consumer client device 208 and/or the computing device 203. For example, a user may textually select the text unit 145b of "425-555-5555" and submit it to a search application such as, for example, a default search engine executed on one or more computing devices 203.

Furthermore, the menu 506 may also provide an external application function call 515 that submits the series of characters of a text unit 145 to an external application. In various embodiments, the external application to be called is determined by a label associated with the text unit 145. In the non-limiting example of FIG. 5, the text unit 145b of "425-555-5555" is associated with the label of a phone number. Accordingly, the external application to be called is a phone application for dialing phone numbers. When a user selects the external application function call 515 in this case, the phone application is executed and the series of characters of the text unit 145b is submitted to the phone application as an input.

It may be the case that the encoded text block 123 includes text units 145 that are not initially associated with labels. That is to say, the text author who created the text block 123 did not specify labels for text units 145 manually and/or automatically. In various embodiments of the present disclosure, the text module 231 is configured to process the encoded text block 123 by determining labels for at least a portion of the text units 145. The text module 231 may extract each of the text units 145 that are embedded in the text block 123 and automatically determine an appropriate label for the text units 145. For example, the text module 231 may analyze the contents and/or context of the text unit 145. For example if the text author who generated the block of text 123 did not assign the text unit 145*b* of "425-555-5555" to a phone number label, then the text module 231 executed on the consumer client device 208 may analyze this text unit 145*b* and assign it a phone number label based on the content and/or the context of the text unit 145*b*. The text module 231, executed along with a text reader 108, may determine that the content of this text unit 145*b* is formatted according to a standard telephone number format. To this end, labels may be assigned during the generation of a text block 123 in a consumer client device 206 or during the decoding of an encoded text block 123 at a consumer client device 208.

The user interface may also provide an ungroup option 518 that instructs the text reader 108 and/or the text module 231 to remove the text unit treatment of a corresponding series of characters. In this respect, the series of characters that make up the text unit 145 are specified to no longer be part of a text unit 145. Put another way, the user may select the ungroup option 518 if the user wishes to unbind the series of characters in order to text select each character individually.

In various embodiments of the present disclosure, the text reader 108 is configured to re-encode the decoded text block 123 to generate a re-encoded text block 123. The re-encoded text block 123 may comprise metadata that identifies a removal of the text unit status of at least one series of characters. In other words, the metadata records the history of a series of characters with respect to text unit status. This may allow a user to determine whether a particular series of characters was previously designated as a text unit 145. For example, if the user selects the ungroup option 518 for the text unit 145*b* of "425-555-5555," then the series of characters of "425-555-5555" is no longer treated as a text unit 145. This action may be recorded in metadata when the text block 123 is re-encoded.

In various embodiments of the present disclosure, each text unit 145 may individually support cryptographic signing in order to guarantee the authenticity of the series of characters associated with a particular text unit 145. In this case, a text author who creates a text unit 145 in a text block 123 may digitally sign the text unit 145 in order to specify that the text unit 145 is authenticated. A consumer client device 208 that decodes the encoded text block 123 with a digitally signed text unit 145 may determine whether the digitally signed text unit 145 is authentic. Thus, the text module 231 that decodes an encoded text block 123 may be configured to indicate to a user whether one or more text units 145 that have been digitally signed are authentic or unauthentic.

For example, a text author who specifies a text unit 145 in the text block 123 may digitally sign a particular text unit 145 using a private key. The private key is linked to a digital signature attribute of the particular text unit 145. Once the particular text unit 145 is embedded in the text block 123 and encoded, a public key is incorporated into the encoded text block 123. To this end, a consumer client device 208 that decodes the encoded text block 123 receives the encoded text block 123 along with the public key such that the public key is used to validate a digital signature associated with the particular text unit 145. When the user modifies or improperly re-encodes a text block 123 that includes a text unit 145 with the digital signature, the text unit 145 is designated as untrusted, altered, tampered, forged, or otherwise unauthentic. Thus, the text module 231 may validate digital signatures associated with text units 145 based on a public key included in the encoded text block 123.

In various embodiments of the present disclosure, the text reader 108 visually offsets each text unit 145 from characters that are not associated with text units 145. For example, the text reader may italicize each series of characters that is associated with the corresponding text unit 145.

Figure 6A:
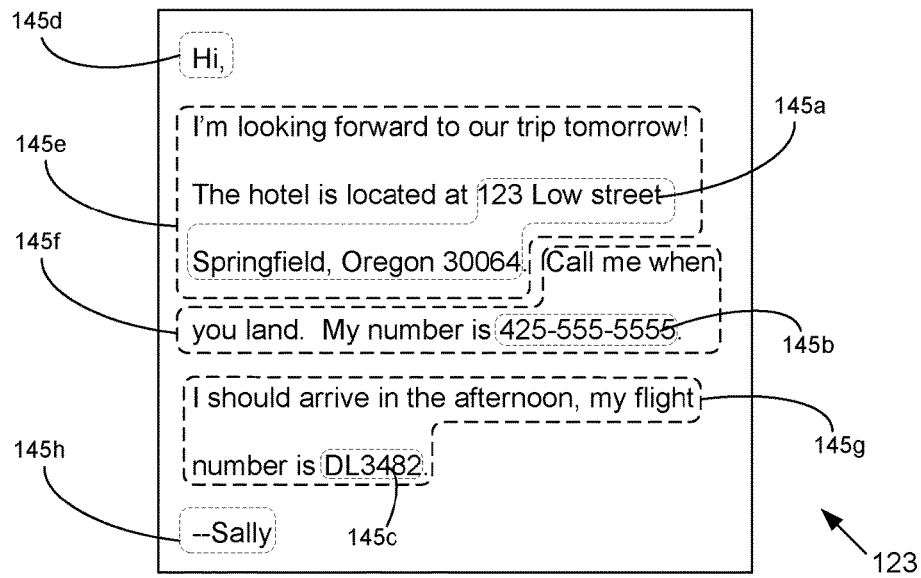
FIG. 6A is a drawing of an example of a text block in the networked environment of FIG. 2 according to various embodiments of the present disclosure.

Turning now to FIG. 6A, shown is an example of a text block 123 in the networked environment 200 of FIG. 2 according to various embodiments of the present disclosure. FIG. 6A provides a non-limiting example of text units 145*a-h* specified in a particular text block 123. Specifically, FIG. 6A depicts specifying complete sentences as a text unit 145*d-h*. Designating a sentence as a text unit 145 may be made in response to a rule that specifies that a series of characters included in a sentence is to be designated as a text unit 145. For example, a text module 231 (FIG. 2), executed along with a text editor 282 (FIG. 2), may be configured to specify each sentence as a text unit 145*d-h*. In addition, the non-limiting example of FIG. 6A depicts various text units 145*a-c* in addition to the text units 145*d-h* that correspond to sentences.

FIG. 6A provides a non-limiting example of text units 145*a-f* that may overlap with one another. In this respect, text units 145*a-c*, 145*e-g* may either overlap, partially overlap, or completely overlap with other text units 145 in a particular text block 123. Thus, text units 145 may be nested in one another. A text reader 108 that decodes a text block 123 that includes nested text units 145*a-f*, may allow a user to perform a text selection of each text unit 145. A text editor 282 may require a user to select an outer text unit 145*e-g* before an inner text unit 145 may be selected, when an outer text unit 145*e-g* completely surrounds an inner text unit 145.

Figure 6B:
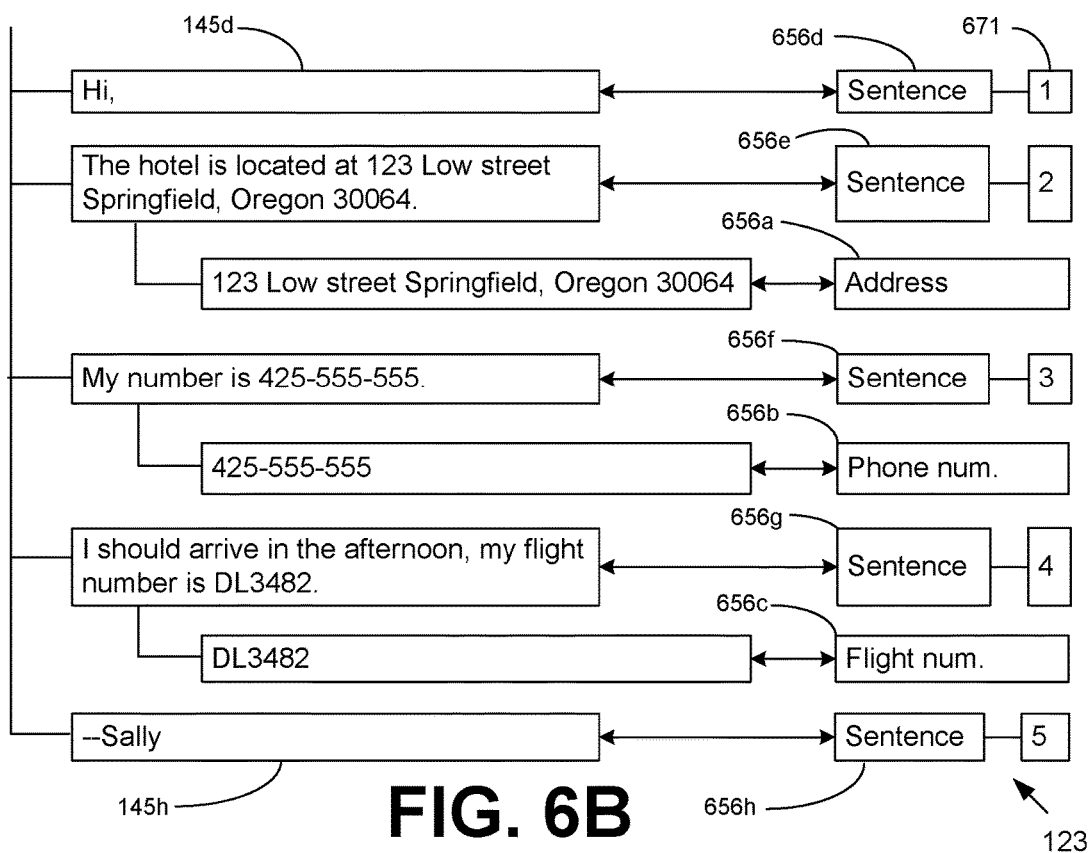
FIG. 6B is a drawing of an example of a text block in the networked environment of FIG. 2 according to various embodiments of the present disclosure.

Next, in FIG. 6B, shown is an example of a text block 123 in the networked environment 200 of FIG. 2 according to various embodiments of the present disclosure. FIG. 6B provides a non-limiting example of associating text units 145*a-h* to corresponding labels 656*a-h*. Each label 656*a-h* may be associated with the sub-label 671.

For example, the text unit 145*a* for an address may be associated with an address label 656*a*. The text unit 145*b* for a phone number may be associated with the phone number label 656*b*. The text unit 145*c* for a flight number may be associated with a flight number label 656*c*. These labels 656*a-c* may be designated manually by a text author or may be designated automatically based on the content and/or context of the series of characters of the text unit 145*a-c*.

Text units 145*d-h* that are based on sentences may be associated with a sentence label 656*d-h*. Furthermore, some labels such as, for example, sentence labels 656, include a sub-label 671. The sub-label 671 may sequence a label. In this respect, the label structure of a text block 123 may reflect an ordering of each label. Sub-labels 671 that specify sequencing may be used for post-processing text blocks 123. For example, labels 656 and sub-labels 671 may be used to post-process a text block 123 to generate a table of contents of an itemized list.

In various embodiments of the present disclosure, a text reader 108 and/or text module 231 is configured to analyze a text block 123 for identifying and extracting text units 145 from the text block 123. Extracted text units 145 may be organized in a database or buffer for processing the text block 123 in accordance with post-processing functions. Thus, post-processing may result in a generation of a list based at least upon the text units 145 in a text block 123. A list may be, for example, a table of contents, an address book, a contact list, a bibliography, a reference list, a directions list, etc.

One example of a post-processing function is identifying all the phone numbers in a text block 123 to generate a contact list of phone numbers. As another example of a post-processing function, addresses, e-mail addresses, names of people, and/or any other contact information may be extracted from the text block 123 to generate an address book. In this respect, through the use of text units 145 and labels 656, a post-processing function may identify relevant information and classify according to specifications provided by a text author. Post-processing without text units 145 may lead to an increased risk of errors in identifying relevant series of characters. For example, identifying city names, proper nouns, geographic locations, or any of their series of characters may be difficult as formatting information might not be standardized. By allowing a text author to specify text units 145, either manually or automatically, a decoded text block 123 is prepared to be post-processed.

As another example of post-processing, labels 656 pertaining to sentences, paragraphs, pages, sections, chapters, page breaks, etc., may be used to generate a table of contents for a text block 123. Furthermore, text units 145, labels 656, and sub-labels 671 may be used to identify and classify bibliographic components within a text block 123. Post-processing such a text block 123 may facilitate the creation of a bibliography for the text block 123. For example, labels for text units 145 may pertain to a creator, title, date of publication, volume number, page number, publisher, or any other bibliographic information.

Figure 7:
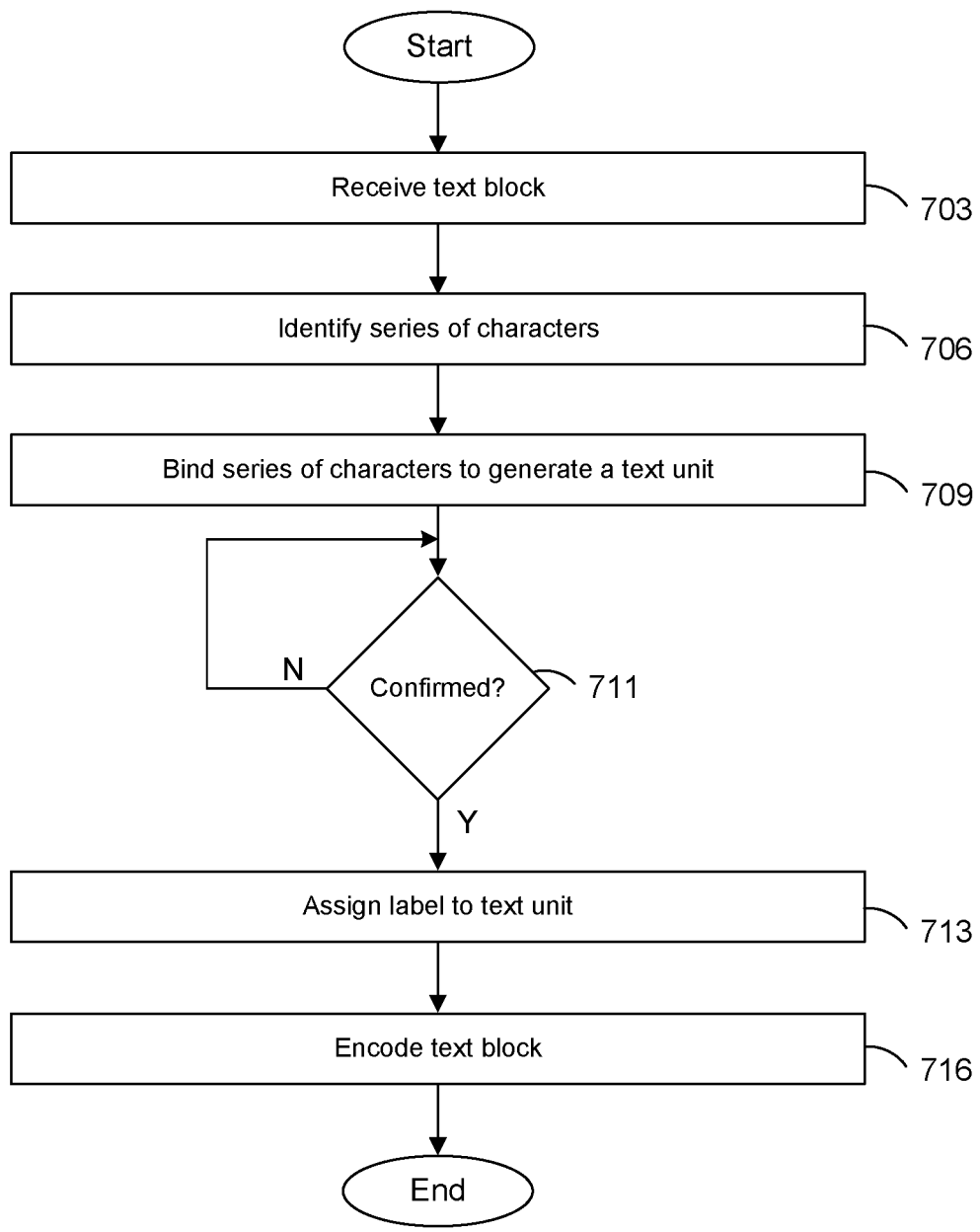
FIG. 7 is a flowchart illustrating one example of functionality implemented as portions of a text module executed in a computing device in the networked environment of FIG. 2 according to various embodiments of the present disclosure.

Referring next to FIG. 7, shown is a flowchart that provides one example of the operation of a portion of the text module 231 executed in a computing device 203 (FIG. 2) and/or client device 206, 208 (FIG. 2) in the networked environment 200 of FIG. 2 according to various embodiments of the present disclosure. It is understood that the flowchart of FIG. 7 provides merely an example of the many different types of functional arrangements that may be employed to implement the operation of the portion of the text module 231 as described herein. As an alternative, the flowchart of FIG. 7 may be viewed as depicting an example of steps of a method implemented in the computing device 203 and/or client devices 206, 208 according to one or more embodiments. The flowchart of FIG. 7 depicts an example of the text module 231 encoding a text block 123 (FIG. 2) to supplement the text editing functionality of processing/authoring the text block 123.

Beginning with block 703, the text module 231 receives a text block such as, for example, the text block 123 of FIG. 1. The text block 123 may be authored by a user or otherwise generated by an entity. The text block 123 comprises many characters for effectuating written communication from a text author or any other authoring entity. The text module 231, in block 706, identifies a series of characters in the text block 123. The series of characters makes up a portion of the characters in the text unit 145 (FIG. 1).

In block 709, the text module 231 binds the series of characters to generate a text unit 145 such as any text unit 145a-h of FIG. 6A. By binding the series of characters to each other, the series of characters receives text block treatment. The series of characters may be detected automatically by the text block module 231 or maybe specified manually by a text author. For automatic detection, the text module 231 may apply one or more rules or may search for one or more sentinel characters to determine whether to identify a series of characters as a text unit 145. In various embodiments, the text module 231 searches for predetermined sentinel characters that signify that a particular string of characters is to be treated as a text unit 145.

In block 711, the text module 231 waits for confirmation from the user that the series of characters is to be treated as a text unit 145. In various embodiments, a user interface is provided to a text author upon the detection of a text unit 145. The user interface facilitates a confirmation that the detected text unit is to be treated as a text unit. When a text unit 145 is manually designated, the text unit 145a-h is automatically confirmed.

In block 713, the text module 231 assigns a label to the text unit 145. The assignment of the label may be specified manually by a text author or the assignment of the label may be designated automatically by the text module 231. A manual specification is received from a text author when a text author selects one or more labels among a set of labels for the text unit 145. An automatic designation of a label for a text unit 145 may be made based at least upon the content and/or context of the series of characters included in the text unit 145. For example, the text module 231 may be configured to identify identifiers, phone numbers, addresses, proper names, etc., based on one or more rules. The text module 231 may be configured to designate a label when a quantifiable confidence value associated with an application of one or more rules exceeds a predetermined threshold amount. For example, the text module 231 is configured to analyze each possible label among a set of labels to determine the most appropriate label. The label associated with the highest confidence value may be applied to the text unit 145.

In block 716, the text module 231 encodes the text block 123. The encoded text block 123 comprises signals for instructing a text reader application to handle the series of characters is a text unit 145. Furthermore, the encoded text block 123 associates each text unit 145 to the corresponding label. The encoded text block 123 may be saved, stored, published, or otherwise uploaded to a computing device 203 over a network 209 (FIG. 2). To this end, the encoded text block 123 is prepared to be rendered for reading by a consumer client device 208.

Figure 8:
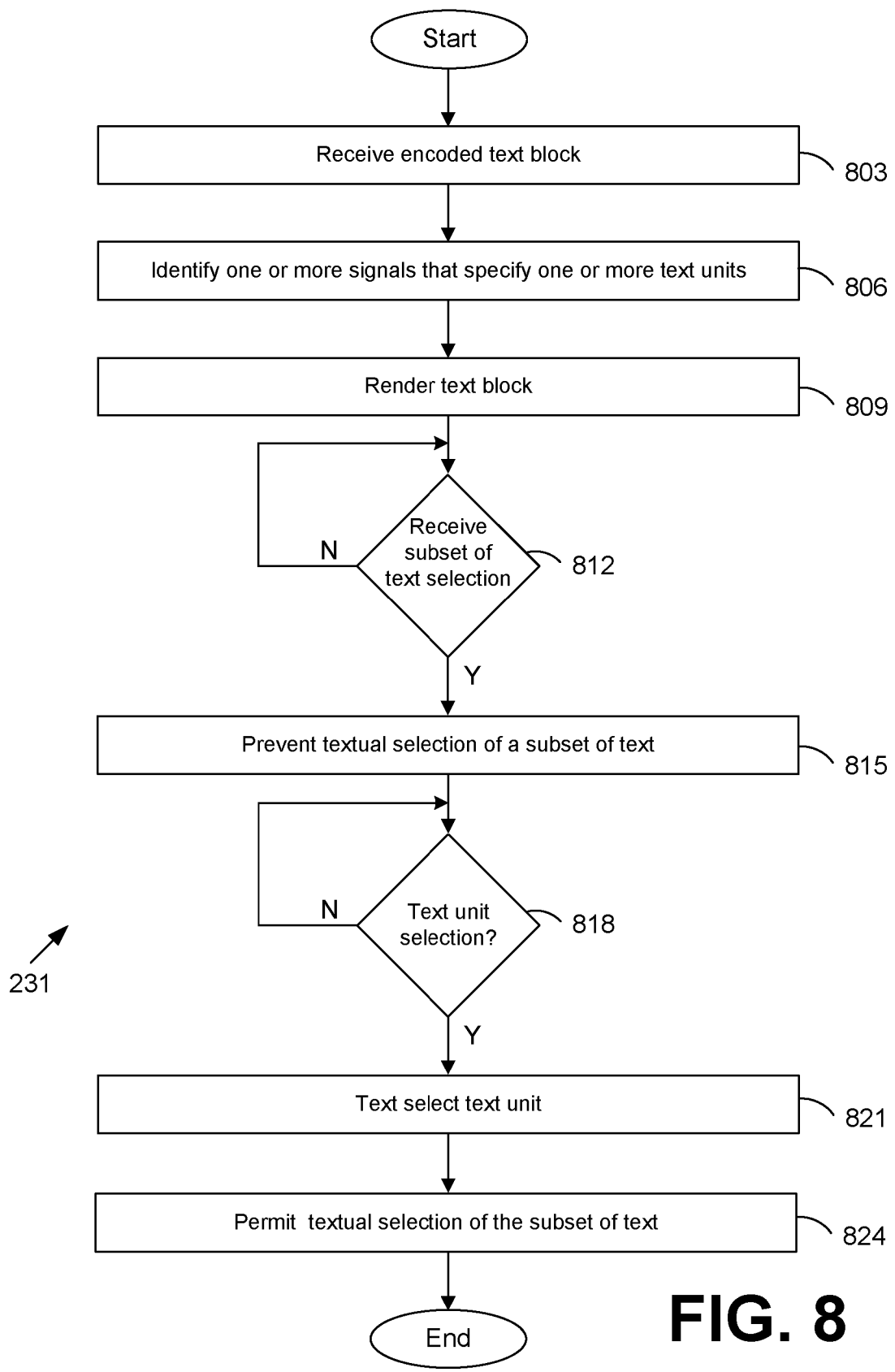
FIG. 8 is a flowchart illustrating one example of functionality implemented as portions of a text module executed in a computing device in the networked environment of FIG. 2 according to various embodiments of the present disclosure.

Referring next to FIG. 8, shown is a flowchart that provides one example of the operation of a portion of the text module 231 executed in a computing device 203 (FIG. 2) and/or client device 206, 208 (FIG. 2) in the networked environment 200 of FIG. 2 according to various embodiments of the present disclosure. It is understood that the flowchart of FIG. 8 provides merely an example of the many different types of functional arrangements that may be employed to implement the operation of the portion of the text module 231 as described herein. As an alternative, the flowchart of FIG. 8 may be viewed as depicting an example of steps of a method implemented in the computing device 203 and/or client devices 206, 208 according to one or more embodiments. The flowchart of FIG. 8 depicts an example of the text module 231 decoding and rendering a text block 123 (FIG. 2) to supplement the text reader functionality of processing/presenting the text block 123 to a user for reading.

To begin, in block 803, a text module 231 receives an encoded text block such as, for example, an encoded text block 123 of FIG. 1. The encoded text block 123 may be, for example, received by way of a network 209 (FIG. 2) by a consumer client device 208. In block 806, the text module 231 identifies one or more signals that specifies one or more text units 145 (FIG. 1) in the encoded text block 123. For example, the text units 145 may be the text units 145a-h of FIG. 6A. Each signal indicates to the text module 231 that a particular text unit 145 is included in the text block 123. In this respect, the text module 231 that is executed along with a text reader 108 may bypass text processing functions to identify relevant portions of text such as, for example, phone numbers, addresses, names, or any other relevant information. That is to say, the signals included in the encoded text block 123 identify the relevant information as text units 145 for the text reader 108.

In block 809, the text module 231 along with a text reader 108, renders the text block 123 for display to a user. For example, the text block 123 is presented in an e-mail application to user. In block 812, the text module 231 waits to receive a selection for a subset of text. For example, a selection for subset of text comprises an attempt to highlight a portion of the text unit 145. In block 815, the text module 231 prevents the textual selection of the subset of text. To this end, a user is prevented from treating the characters in the text unit 145 individually in terms of text selection.

In block 818, the text module 231 waits for a text unit selection. A text unit selection may occur when a user clicks or otherwise selects the text unit 145. By selecting the text unit 145, the user selects all of the characters associated with the text unit 145. In block 821, the text module 231 facilitates a text selection of the text unit 145. The text selection of the text unit 145 from the user triggers a text selection for the entire series of characters. In block 824, the text module 231 permits the user to perform a textual selection of a subset of the text associated with the text unit 145a-h.

Figure 9:
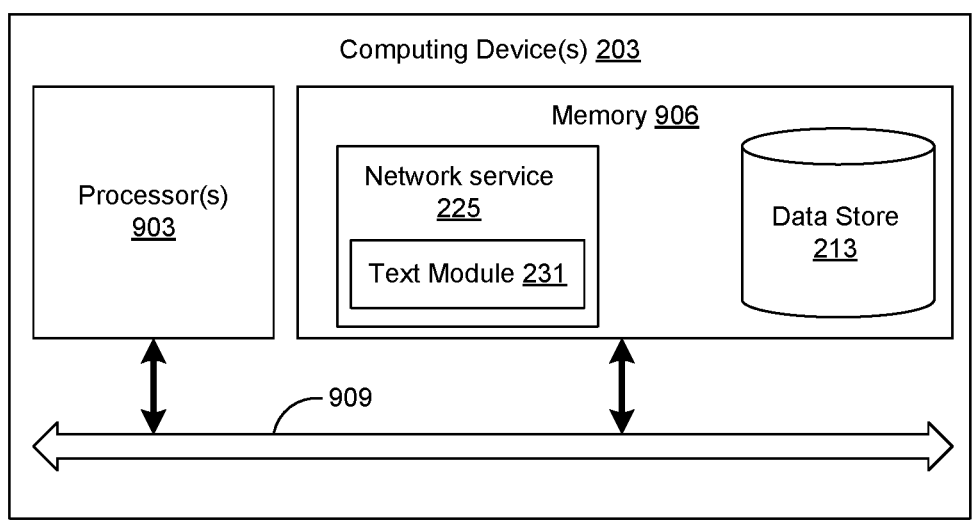
FIG. 9 is a schematic block diagram that provides one example illustration of a computing device employed in the networked environment of FIG. 2 according to various embodiments of the present disclosure.

With reference to FIG. 9, shown is a schematic block diagram of the computing device 203 according to an embodiment of the present disclosure. The computing device 203 includes at least one processor circuit, for example, having a processor 903 and a memory 906, both of which are coupled to a local interface 909. To this end, the computing device 203 may comprise, for example, at least one server computer or like device. The local interface 909 may comprise, for example, a data bus with an accompanying address/control bus or other bus structure as can be appreciated.

Stored in the memory 906 are both data and several components that are executable by the processor 903. In particular, stored in the memory 906 and executable by the processor 903 is the network service 225 and potentially other applications. Also stored in the memory 906 may be the data store 213 and other data. In addition, text module 231 may be stored in the memory 906 and executable by the processor 903.

It is understood that there may be other applications that are stored in the memory 906 and are executable by the processors 903 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 906 and are executable by the processor 903. In this respect, the term "executable" means a program file that is in a form that can ultimately be run by the processor 903. Examples of executable programs may be, for example, a compiled program that can be translated into machine code in a format that can be loaded into a random access portion of the memory 906 and run by the processor 903, source code that may be expressed in proper format such as object code that is capable of being loaded into a random access portion of the memory 906 and executed by the processor 903, or source code that may be interpreted by another executable program to generate instructions in a random access portion of the memory 906 to be executed by the processor 903, etc. An executable program may be stored in any portion or component of the memory 906 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 906 is defined herein as including both volatile and nonvolatile memory and data storage components. Volatile components are those that do not retain data values upon loss of power. Nonvolatile components are those that retain data upon a loss of power. Thus, the memory 906 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 903 may represent multiple processors 903 and the memory 906 may represent multiple memories 906 that operate in parallel processing circuits, respectively. In such a case, the local interface 909 may be an appropriate network 209 (FIG. 2) that facilitates communication between any two of the multiple processors 903, between any processor 903 and any of the memories 906, or between any two of the memories 906, etc. The local interface 909 may comprise additional systems designed to coordinate this communication, including, for example, performing load balancing. The processor 903 may be of electrical or of some other available construction.

Although the network service 225, text module 231 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 7 and 8 show the functionality and operation of an implementation of portions of the text module 231. The text module 231 may be implemented as a portion of a text editor 282 (FIG. 2) or a text reader 108 (FIG. 1). If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 903 in a computer system or other system. The machine code may be converted from the source code, etc. If embodied in hardware, each block may represent a circuit or a number of interconnected circuits to implement the specified logical function(s).

Although the flowcharts of FIGS. 7 and 8 show a specific order of execution, it is understood that the order of execution may differ from that which is depicted. For example, the order of execution of two or more blocks may be scrambled relative to the order shown. Also, two or more blocks shown in succession in FIG. 4 may be executed concurrently or with partial concurrence. Further, in some embodiments, one or more of the blocks shown in FIGS. 7 and 8 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the network service 225 and/or text module 231, that comprises software or code can be embodied in any non-transitory computer-readable medium for use by or in connection with an instruction execution system such as, for example, a processor 903 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method, comprising:
   identifying, by at least one computing device, a series of characters within a text block, the series of characters being a subset of the text block;
   binding, by the at least one computing device, the series of characters to generate a text unit;
   encoding, by the at least one computing device, the text block to generate an encoded text block, wherein the encoded text block comprises a first signal indicating that an entirety of the series of characters in the text unit is to be selected in response to a subset of the series of characters being selected;
   selecting, by the at least one computing device, in response to the first signal and at least a portion of the subset of the series of characters being selected, the entirety of the series of characters in the text unit; and
   encoding, by the at least one computing device, in response to an instruction to treat the series of characters as being unbound, the text block to generate a modified encoded text block, wherein the modified encoded text block comprises a second signal indicating that a portion of the series of characters is to be selected in response to the portion of the series of characters being selected.

2. The method of claim 1, wherein the text unit comprises a cryptographic signature.

3. The method of claim 2, further comprising determining, by the at least one computing device, that the text unit is authentic based at least in part upon the cryptographic signature.

4. The method of claim 3, further comprising validating, by the at least one computing device, the cryptographic signature in the text unit based at least in part upon a public key.

5. The method of claim 1, further comprising assigning, by the at least one computing device, a label to the text unit based at least in part upon content in the text unit, wherein the label specifies that the text unit is a particular class of text unit.

6. A system, comprising:
   at least one computing device; and
   a plurality of computer instructions executable by the at least one computing device, wherein the plurality of computer instructions, when executed, cause the at least one computing device to at least:
   designate a series of characters in a text block as being a text unit;
   bind the series of characters together;
   encode the text block to generate an encoded text block, the encoded text block comprising a first signal indicating that an entirety of the series of characters in the text unit is to be selected in response to a subset of the series of characters being selected;
   select, in response to the first signal and at least a portion of the subset of the series of characters being selected, the entirety of the series of characters in the text unit; and
   encode, in response to an instruction to treat the series of characters as being unbound, the text block to generate a modified encoded text block, wherein the modified encoded text block comprises a second signal indicating that a portion of the series of characters is to be selected in response to the portion of the series of characters being selected.

7. The system of claim 6, wherein the plurality of computer instructions further cause the at least one computing device to at least sign the text unit with a private key associated with a digital signature attribute of the text unit.

8. The system of claim 7, wherein the plurality of computer instructions further cause the at least one computing device to at least validate the digital signature attribute with a public key.

9. The system of claim 6, wherein the plurality of computer instructions further cause the at least one computing device to at least designate an additional series of characters in the text block as an additional text unit.

10. The system of claim 6, wherein the plurality of computer instructions further cause the at least one computing device to at least designate the series of characters in the text block as the text unit in response to a rule.

11. The system of claim 10, wherein the rule specifies designating the series of characters as the text unit in response to a presence of a specified character in the text block.

12. The system of claim 10, wherein the rule specifies designating the series of characters as the text unit in response to a presence of a number in the text block.

13. The system of claim 10, wherein the rule specifies designating the series of characters as the text unit in response to a presence of a specified word in the text block.

14. The system of claim 6, wherein the plurality of computer instructions further cause the at least one computing device to at least render the text block with the text unit being visually contrasted from a remainder of the text block.

15. A method, comprising:
   binding, by the at least one computing device, a series of characters within a text block to generate a text unit, wherein the series of characters is a subset of the text block;
   encoding, by the at least one computing device, the text block to generate an encoded text block, wherein the encoded text block comprises a first signal indicating that an entirety of the series of characters in the text unit is to be selected in response to a subset of the series of characters being selected;
   rendering, by the at least one computing device, in response to the first signal and at least a portion of the subset of the series of characters being selected, the text block with the entirety of the series of characters in the text unit shown as selected; and
   encoding, by the at least one computing device, in response to an instruction to treat the series of characters as being unbound, the text block to generate a modified encoded text block, wherein the modified encoded text block comprises a second signal indicating that a portion of the series of characters is to be selected in response to the portion of the series of characters being selected.

16. The method of claim 15, further comprising signing, by the at least one computing device, the text unit with a digital signature using at least a private key.

17. The method of claim 16, further comprising determining, in the at least one computing device, that the text unit is authentic based at least in part upon a digital signature attribute associated with the digital signature.

18. The method of claim 16, further comprising validating, in the at least one computing device, the digital signature associated with the text unit based at least in part upon a public key.

19. The method of claim 15, wherein the instruction to treat the series of characters as being unbound comprises a user input.

20. The method of claim 15, further comprising assigning, by the at least one computing device, a label to the text unit based at least in part upon content in the text unit, wherein the label specifies that the text unit is a particular class of text unit.

* * * * *